United States Patent [19]
North

[11] Patent Number: 5,955,790
[45] Date of Patent: Sep. 21, 1999

[54] APPARATUS FOR CONVERTING TIDE/ WAVE MOTION TO ELECTRICITY

[76] Inventor: Vaughn W. North, 5076 S. 2100 East, Sandy, Utah 84117

[21] Appl. No.: 09/041,922

[22] Filed: Mar. 13, 1998

[51] Int. Cl.$^6$ .................................................. F03B 13/12
[52] U.S. Cl. .............................. 290/53; 290/42; 310/339; 310/337
[58] Field of Search ..................... 290/42, 53; 60/398, 60/497; 310/337, 338, 339; 417/330

[56] References Cited

U.S. PATENT DOCUMENTS

| | | | |
|---|---|---|---|
| 4,258,269 | 3/1981 | Tsubota | 290/53 |
| 4,288,985 | 9/1981 | Dyck | 60/398 |
| 4,404,490 | 9/1983 | Taylor et al. | 310/339 |
| 4,685,296 | 8/1987 | Burns | 60/497 |
| 4,741,157 | 5/1988 | Nishikawa | 60/398 |
| 5,105,094 | 4/1992 | Parker | 290/53 |
| 5,548,177 | 8/1996 | Carroll | 310/339 |
| 5,552,656 | 9/1996 | Taylor | 310/337 |
| 5,552,657 | 9/1996 | Epstein et al. | 310/339 |
| 5,578,889 | 11/1996 | Epstein | 310/339 |

*Primary Examiner*—Nestor Ramirez
*Assistant Examiner*—Nicholas Ponomarenko
*Attorney, Agent, or Firm*—Thorpe, North & Western

[57] ABSTRACT

A power transfer system for generating electrical energy from recurring wave and tidal movement within the ocean. The system comprises a pressure sensing device, such as an array of pressure transducers, positioned at the ocean floor below water level and at a location of wave movement for (i) registering changes in height of water above the pressure sensing device and (ii) providing a power output corresponding to changes in force associated with the changes in the height of water. A transfer medium is coupled at one end to the pressure sensing device and extends underground to a second end at a shore location adjacent the location of wave movement for transmitting the power output of the pressure sensing device to the shore location. A bank of storage batteries is coupled to the transfer medium at the shore location for receiving the power output from the transfer medium and for storing the power output as a useful form of energy.

15 Claims, 2 Drawing Sheets

APPARATUS FOR CONVERTING TIDE/WAVE MOTION TO ELECTRICITY

BACKGROUND OF THE INVENTION

1. Field of the Invention

The present invention relates to methods and devices for converting the energy from ocean tides and waves to useful energy. More particularly, the present invention relates to the conversion of period wave motion present on beaches of the ocean to useful electrical energy.

2. Prior Art

Since the beginning of time, man has viewed the power of the oceans with awe and has long sought methods for harnessing this power for useful purposes. Perhaps one of the greatest forms of natural energy associated with the oceans is the recurring tides and waves that define the constantly changing boarders to these massive bodies of water. Powered by gravitational forces of the moon and changing weather conditions of wind, temperature and rain, the ever changing tides and resulting propagation of wave motion across the majority of surface of the earth generate an immeasurable force which continually pounds virtually every exposed shoreline of every continent of the world.

Attempts to tap this source of energy have experienced only nominal success. Whereas development of hydroelectric power sources on rivers has been a simple matter of applying a turbine to a moving stream of water, the capture of water movement of periodic waves has been a formidable challenge. Hundreds of devices have been contrived to directly respond to the ocean movements; however, none has survived the test of general commercial application. Typical approaches to this problem have included the use of moving paddles, buoys, wheels, and a myriad of other floating or tethered objects designed to move laterally with the currents in a rhythmic pattern, while transferring this energy to a mechanical linkage capable of generating electrical output.

A primary flaw in such systems is the dependence upon moving mechanical parts to provide the medium of transfer of force from the oceans to a turbine generator. Such mechanical assemblies are not only expensive, but require regular maintenance and repair. Furthermore, they are typically vulnerable to changing weather conditions, which are manifest in severe forces capable of crushing the strongest of structures. In addition, the constantly changing tides mandate complex height adjustment mechanisms to adjust to changing water levels. The resulting variations in operating conditions makes it difficult to provide a single system that is capable of coping with the multitude of variables which must be satisfied in a mechanical system of energy conversion.

What is needed is a transfer medium which operates in response to the periodic wave motion of the waters, but in a manner independent from the water conditions to produce electrical energy. The system must be economically feasible by favorably balancing cost of energy production versus kilowatt output.

OBJECTS AND SUMMARY OF THE INVENTION

It is an object of the present invention to.

It is a further object of the invention to generate electrical power in response to changing weights of water over a submerged surface as a function of time.

Yet another object of this invention is to develop conversion of wave motion to electrical power without depending upon moving objects within the water.

A still further object of this invention is the conversion of tidal energy and recurring wave motion to electrical energy indirectly based on changes in weight of the water as it flows onto and recedes from the beach in a recurring manner.

These and other objects are realized in a power transfer system for converting recurring wave and tidal movement within the ocean to useful energy without the need for placement of mechanical structure within the moving water. The system comprises pressure sensing device, such as an array of pressure transducers, is positioned at the ocean floor and at a location of wave movement for (i) registering changes in height of water above the pressure sensing device and (ii) providing a power output corresponding to changes in force associated with the changes in the height of water. A transfer medium is coupled at one end to the pressure sensing device and extends underground to a second end at a shore location adjacent the location of wave movement for transmitting the power output of the pressure sensing device to the shore location. A power conversion device such as a bank of storage batteries is coupled to the transfer medium at the shore location for receiving the power output from the transfer medium and for processing the power output to electricity. Other benefits and features will be apparent to those skilled in the art, based on the following detailed description, taken in combination with the accompanying drawings.

DETAILED DESCRIPTION OF THE INVENTION

The present invention arises from the observation that indirect conversion of wave movement to electrical energy could avoid the mechanical limitations previously experienced with paddles, wheels and floating systems. The challenge is how to capture the lateral movement of water in a reciprocating manner without being subject to physical wear or damage resulting from the sometimes violent thrust and receding movement of powerful ocean waves. Indeed, the perception within the prior art was to accept the limitation that conversion of the power of ocean tides and waves required a device that would respond to this lateral movement, and then convert this to rotary movement within a turbine or some other energy transfer medium. An inspection of the hundreds of devices and methods which have attempted to tap the ocean's energies quickly reveals this common paradigm.

The present invention adopts a new approach of indirect power conversion. Instead of focusing on the lateral movement of the ocean waters as the source of power, the new paradigm involves considering the vertical force applied by the laterally moving waters. In simple terms, the invention arises with the observation that the lateral movement of water is accompanied by a change in water level at the surface, and an accompanying change in water depth. This variance in depth provides an immediate variation in weight, as recurring greater and lesser volumes of water pass over any given area of submerged beach or ocean floor. In essence, the recurring rise and fall of water level can be viewed as a pumping mechanism which operates independently of the severity of weather conditions at the ocean surface. Indeed, the more severe the weather and wave action is, the greater is the energy input to the ocean, leading to greater and more frequent variation in depth changes.

In basic terms, the energy transfer system can be viewed as a column of water which varies in height in a recurring manner. This changing column of water possesses potential energy equal to the difference in height between the maximum height of any given wave and the lowest level water possible when the wave has receded. The difference in height represents an applied load (dependent upon the mass of the water) which can be transferred through a conversion medium to other forms of potential or kinetic energy. The recurring nature of this changing volume enables simulation of a pumping mechanism, powered indirectly by the wave action of the ocean.

Figure 1:
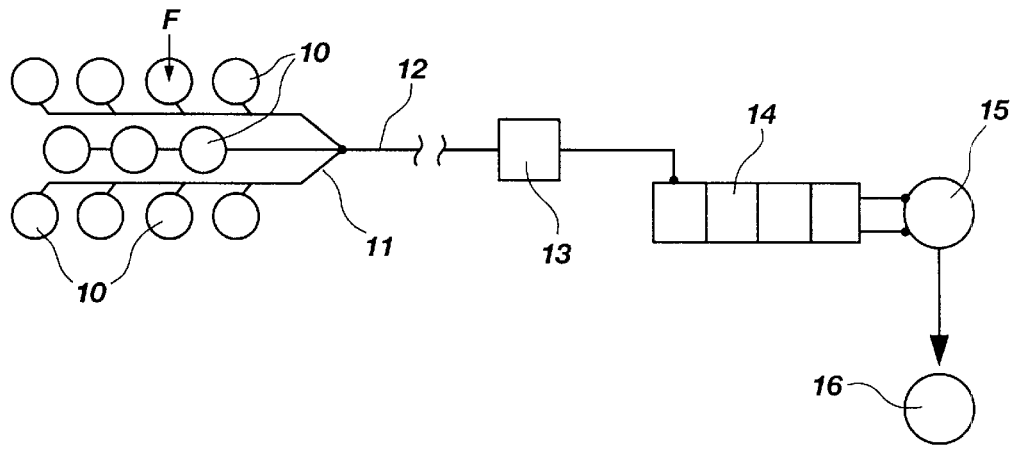
FIG. 1 graphically represents an array of pressure transducers coupled to a battery storage system, including access to utility power transfer lines.

FIG. 1 illustrates an indirect conversion medium which has no moving parts and is substantially free from the direct movement associated with currents and tides. Hereagain, this aspect of the invention arises with the observation that power transfer from the recurring wave action can be realized below the water level, under the ocean floor. This consideration requires an additional shift in paradigm to recognize that the sand base below the ocean water can be used as a pressure transfer medium for passing the changing load of the column of ocean water into a form of electrical energy, free from radical currents and possible attack of sea life. In fact, the fluid nature of sand and its excellent compaction characteristics provides an ideal medium for this energy conversion.

Accordingly, the present invention utilizes an array of pressure sensitive devices, such as piezoelectric pressure transducers T10, which are individually coupled to a conductive wire 11, which interfaces with a common conductor 12. This embodiment of the invention applies the capacity of piezoelectric material to convert an applied physical stress to voltage output. For example, numerous piezoelectric materials are known which are applied in microphone devices, stress meters, etc., which provide an analog output voltage proportional to the applied change in stress or loading. Typically, this voltage is used to measure changes in applied stress to a mechanical component and is coupled to a meter and associated circuitry to define an analog measurement of the applied load. In the present invention, the changing weight applied by the column of water can be used to develop a physical change on the piezoelectric material, resulting in a voltage output. This output voltage causes current flow along the coupled wires 11 and 12 to a battery storage unit 14. Electric power is stored in the battery based on the continual current flow supplied by the recurring wave action.

The mathematical relationship between current and applied load is dependent upon the specific piezoelectric material selected. Those skilled in the art of piezoelectric materials have developed representative constants $e_i$ which predict the surface charge density of selected materials. Calculations based on the dimensions of the transducer material and applied force demonstrate that current flow can be regularly pumped from a submerged array of transducers below a changing load supplied by wave action of the ocean. For example, it is estimated that a one square meter array of barium titanate having a thickness of one centimeter can supply up to 0.000013 amps with a changing applied force of one newton, based on the relationship:

$$Current = 0.000013 \times Force^2$$

Therefore, ten newtons can yield up to 1.3 ma of current. Although the current flow may be perceived as nominal, the ability to place thousands of transducer arrays which respond every few seconds with a new surge of current, when multiplied over years of maintenance free operation, can represent a significant source of energy. The use of battery storage units 14 permits the accumulation of such microenergy pulses to establish commercial applications for the energy conversion system. A diode gate 13 or other unidirectional current regulator provides a simple check against reverse drainage of power from the battery storage system 14. Appropriate connections can be made to a utility company 15 for power distribution to consumers 16.

Figure 2:
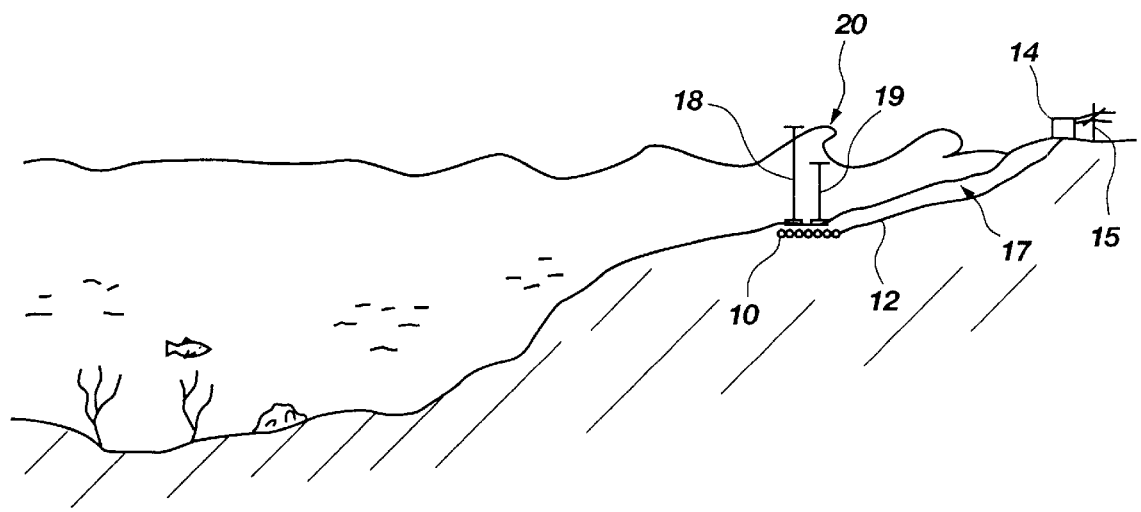
FIG. 2 represents a cross section of ocean beach which has been modified with tidal energy transfer system as shown in FIG. 1.

FIG. 2 graphically illustrates one embodiment of positioning such a transducer array below the sea bed or beach area 17. The array of transducer material 10 is positioned several feet below the transient surface of sand. Appropriate protective coatings such as polyurethane or some other material can be applied to minimize exposure to water. This location will typically be sufficiently close to the shore so that installation can be readily accomplished during low tide.

Emplacement can be mechanized by a mobile unit which crawls along the beach floor and fluidizes or trenches the sand sufficient to bury the array of transducers. A mat of transducers, for example, could be disposed within the fluidized sand at the base of the trench, after which the sand would be allowed to settle and cover the mat for protection. This material can be laid in long strips, with a common lead 11 being coupled to a single wire 12 which is connected to a battery storage unit 14 and buried a safe distance below ground.

Once in position, the transducer material remains static and should require little or no maintenance. Nevertheless, each few seconds beings a new wave 20, giving a rise in water level and attendant change in pressure. This pressure loads the transducer material, generating a pulse of current which is transmitted to the battery storage unit 14. The amount of current will depend upon the change of water level from peak wave height 18 to trough level 19. This recurring shift every several seconds will continue to pump energy to the system for decades, with little additional expense beyond installation and initial cost of materials.

Figure 3:
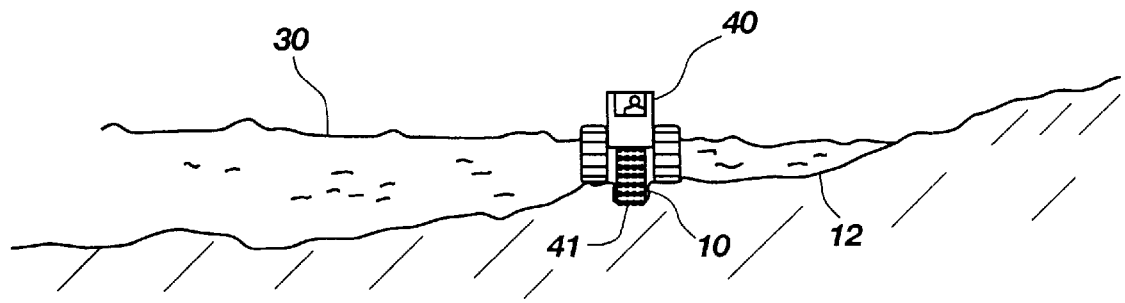
FIG. 3 graphically illustrates a process for laying a grid of pressure transducers within a fluidized trench under the beach area of an ocean water source.

FIG. 3 illustrates one method for positioning the subject invention at an operable location. First, a trench 41 is excavated along a section of ocean floor 17 below a region of ocean water 30 which is subject to constantly changing water elevations. A trenching device 40 travels along the ocean floor 17. The mat of transducers 10 is buried within the trench 41 at a depth which protects the transducer mat 10 from adverse exposure to ocean currents and sea life.

One method for excavating the disclosed trench 41 involves fluidizing sand and silt at the ocean floor 17 to form the trench as a liquid slurry. The transducer mat is laid within the fluidized sand and silt, which then is allowed to settle over and bury the transducer mat to the desired depth. The mat is then connected by means of a conductive wire 17 to the shoreline where it may be coupled to storage batteries, or the like. It will be apparent to those skilled in the art that numerous methods can be utilized to lay the transducer mat 10 at the ocean floor to establish a stable, stationary position with respect to the changing height of water overhead.

Figure 4:
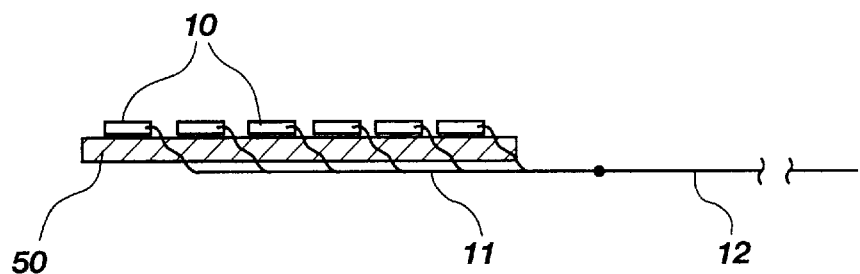
FIG. 4 illustrates a mat of transducers secured to a rigid grid support for placement at the ocean floor, under several feet of sand, with a connecting wire for attachment to a power storage bank.

FIG. 4 shows a mat of transducers 10 secured to a rigid grid support 50 for placement at the ocean floor as illustrated above. A connecting wire 11 couples the respective transducers 10 to a power storage bank 14. The rigid grid support 50 supplies the stiffness for supporting the mat of transducers 10 as described above.

Various techniques may be applied to convert the kinetic energy of the column of water to useful power. One example is a piston 40 coupled to a rotary transmission assembly 41. The output of this assembly may be coupled to a turbine for generating electricity. Hereagain, the energy source is the ocean, which is essentially undisturbed by the subject power transfer configuration. There are no moving parts directly affected by turbulence at sea or unfriendly sea life such as barnacles and plant life that could attack a submerged structure. The violent movement of water is buffered by simply relying on changes in water pressure to equalize an isolated column of water within a controlled water tower. The only mechanical parts would be housed in a protective power plant located along the shore, which would float at the surface of the isolated column of water.

Other embodiments of the present invention will be apparent to those skilled in the art. It is therefore to be understood that the exemplary disclosures above are not intended to be limited, except by the following claims.

I claim:

1. A power transfer system for converting recurring wave movement within the ocean to electrical energy, said system comprising:

pressure sensing means positioned at a stationary location at an ocean floor below water level and below a location of wave movement for (i) registering changes in height of water above the pressure sensing means and (ii) providing a power output corresponding to changes in force associated with the changes in the height of water;

a transfer medium coupled at one end to the pressure sensing means and extending along the ocean floor to a second end at a shore location adjacent the location of wave movement, said transfer medium including means for transmitting the power output of the pressure sensing means to the shore location; and electrical storage means coupled to the transfer medium at the shore location for receiving the power output from the transfer medium and for storing the power output as a useful form of electrical energy.

2. A power transfer system as defined in claim 1, wherein the pressure sensing means comprises a pressure transducer which responds to changes in pressure and supplies the power output as an output voltage.

3. A power transfer system as defined in claim 2, wherein the pressure transducer comprises a piezoelectric material which responds to changes in pressure to produce the power output, said transfer medium comprising a conductive material connected at one end to the pressure transducer and at the other end to the power conversion means.

4. A power transfer system as defined in claim 1, wherein the pressure sensing means comprises an interconnected array of pressure transducers including an output connection coupled to the power transfer medium.

5. A power transfer system as defined in claim 4, wherein the array of pressure transducers are interconnected in parallel relationship to an output connection which cumulates voltage output from individual pressure transducers for transmission to the transfer medium.

6. A power transfer system as defined in claim 2, wherein the electrical storage means comprises a battery storage system for storing electrical energy.

7. A power transfer system as defined in claim 3, wherein the array of transducers are buried within a section of ocean floor.

8. A power transfer system as defined in claim 7, wherein the transfer medium comprises connecting wire which is buried within a section of ocean floor between the array of transducers and the power conversion means.

9. A power transfer system as defined in claim 3, wherein the array of pressure transducers comprises a mat of interwoven pressure transducers and connecting wires, said mat including a common output lead coupled to the transfer medium.

10. A power transfer system as defined in claim 9, wherein the power transfer system comprises a plurality of mats having connecting wires from the common output leads to the transfer medium.

11. A power transfer system as defined in claim 1, wherein the pressure sensing means comprises a sheet of piezoelectric material which responds to changes in pressure by generating an output voltage, said sheet being coupled to a connecting conductor which forms the transfer medium.

12. A power transfer system as defined in claim 11, wherein the piezoelectric material includes a PVDF composition.

13. A method for converting recurring wave movement within the ocean to useful energy, said method comprising the steps of:

a) positioning pressure sensing means below water level and at an ocean floor location which stabilizes the pressure sensing means against movement by the wave movement of the ocean for (i) registering changes in height of water above the pressure sensing means and (ii) providing a power output corresponding to changes in force associated with the changes in the height of water;

b) generating electrical power output from the pressure sensing means;

c) transferring energy representing the power output to a shore location adjacent the location of wave movement but protected on land from adverse weather conditions; and d) storing energy at the protected shore location for future use.

14. A method as defined in claim 13, further comprising the step of:

a) excavating a trench along a section of ocean floor below a region of ocean water which is subject to constantly changing water elevations; and b) burying the pressure sensing means within the trench at a depth which protects the pressure sensing means from adverse exposure to ocean currents and sea life.

15. A method as defined in claim 14, wherein the step of excavating the trench comprises the further steps of:

a) fluidizing sand and silt to form the trench as a liquid slurry, while concurrently inserting the pressure sensing means within the fluidized sand and silt; and b) allowing the fluidized sand and silt to settle over and bury the pressure sensing means at a desired depth under the ocean floor.

* * * * *